United States Patent
Bigbee et al.

(10) Patent No.: US 6,289,431 B1
(45) Date of Patent: Sep. 11, 2001

(54) METHOD AND APPARATUS FOR ACCESSING MORE THAN 4 GIGABYTES OF PHYSICAL MEMORY WITH 4-BYTE TABLE ENTRIES

(75) Inventors: Bryant E. Bigbee, Aloha; Lance E. Hacking, Hillsboro; Shahrokh Shahidzadeh, Beaverton; Shreekant S. Thakkar, Portland, all of OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/013,414

(22) Filed: Jan. 26, 1998

(51) Int. Cl.[7] .................................................... G06F 12/02
(52) U.S. Cl. ........................................... 711/206; 711/207
(58) Field of Search ................................... 711/203, 206, 711/207, 170, 171, 172, 173

(56) References Cited

U.S. PATENT DOCUMENTS

| 5,430,856 | * | 7/1995 | Kinoshita | 711/209 |
|---|---|---|---|---|
| 5,617,554 | | 4/1997 | Alpert et al. | 711/208 |
| 5,796,978 | * | 8/1998 | Yoshioka et al. | 711/206 |
| 5,802,605 | * | 9/1998 | Alpert et al. | 711/208 |
| 5,956,756 | * | 9/1999 | Khalidi et al. | 711/207 |
| 6,026,476 | * | 2/2000 | Rosen | 711/206 |

* cited by examiner

Primary Examiner—Hiep T. Nguyen
(74) Attorney, Agent, or Firm—Blakely, Sokoloff, Taylor & Zafman LLP

(57) ABSTRACT

A method and apparatus for accessing pages in physical memory, where the physical memory is described. The present invention provides a paged memory system having multiple page sizes. Pages of a first size are accessed via a page directory entry and a corresponding page table entry. The page directory entry stores a base physical address for a corresponding page table and control bits indicating permissions. The page table entry stores a base physical address of the page in memory. In one embodiment, the page table entry inherits permissions from the page directory entry. Pages of a second size are accessed via a page directory entry that stores a base physical address of the page and control bits indicating permissions associated with the page. In another embodiment, entries to the page directory table and the page table are 4-bytes in size and provide paging for memory up to 1.1 Terabytes in size.

22 Claims, 11 Drawing Sheets

FIG. 4A

| 31 | 12 11 | 9 8 | 7 | 6 | 5 | 4 | 3 | 2 | 1 | 0 |
|---|---|---|---|---|---|---|---|---|---|---|
| PAGE TABLE BASE ADDRESS | AVAIL | G | P S | O | A | P C D | P W T | U / S | R / W | P |

FIG. 4B

| 31 | 12 11 | 9 8 | 7 | 6 | 5 | 4 | 3 | 2 | 1 | 0 |
|---|---|---|---|---|---|---|---|---|---|---|
| PAGE BASE ADDRESS | AVAIL | G | O | D | A | P C D | P W T | U / S | R / W | P |

FIG. 4C

| 31 | 22 21 | 12 11 | 9 8 | 7 | 6 | 5 | 4 | 3 | 2 | 1 | 0 |
|---|---|---|---|---|---|---|---|---|---|---|---|
| PAGE BASE ADDRESS | RESERVED | AVAIL | G | P S | D | A | P C D | P W T | U / S | R / W | P |

FIG. 7A

| 63 | 36 35 | 32 |
|---|---|---|
| RESERVED | PAGE DIRECTORY BASE ADDRESS | |

| 31 | 12 11 | 9 8 | 5 | 4 | 3 | 2 | 0 |
|---|---|---|---|---|---|---|---|
| PAGE DIRECTORY BASE ADDRESS | AVAIL | RESERVED | | P C D | P W T | RESERVED | |

FIG. 7B

| 63 | 36 35 | 32 |
|---|---|---|
| RESERVED | PAGE TABLE BASE ADDRESS | |

| 31 | 12 11 | 9 8 | 7 | 6 | 5 | 4 | 3 | 2 | 1 | 0 |
|---|---|---|---|---|---|---|---|---|---|---|
| PAGE TABLE BASE ADDRESS | AVAIL | 0 | 0 | 0 | A | P C D | P W T | U/S | R/W | P |

| 31 | 22 21 | 17 16 | 13 12 | 11 | 9 8 | 7 | 6 | 5 | 4 | 3 | 2 | 1 | 0 |
|---|---|---|---|---|---|---|---|---|---|---|---|---|---|
| LOWER BASE ADDR. BITS | RES | UPPER BASE ADDR. BITS | O | AVAIL | G | PS | D | A | PCD | PWT | U/S | R/W | P |

FIG. 10B

| 31 | 12 11 | 9 8 | 7 | 6 | 5 | 4 | 1 | 0 |
|---|---|---|---|---|---|---|---|---|
| LOWER BASE ADDR. BITS | AVAILABLE | G | PS | D | A | UPPER BASE ADDR. BITS | P |

METHOD AND APPARATUS FOR ACCESSING MORE THAN 4 GIGABYTES OF PHYSICAL MEMORY WITH 4-BYTE TABLE ENTRIES

FIELD OF THE INVENTION

The present invention relates to memory management in a computer system, and more specifically, to a method and apparatus for providing paged memory in the computer system.

BACKGROUND OF THE INVENTION

As memory paging schemes have developed, certain formats have been frequently used. For example, one common paging scheme is to have up to 4 Gigabytes of memory divided into multiple 4-kilobyte pages. Directory entries and page table entries in such a scheme are 4-byte (32-bit) entries having a base address and multiple control bits that indicate permissions. For 16- and 32-bit processors, such a scheme is sufficient.

For many years operating systems have been written for paging schemes with 4-byte table entries and 4-kilobyte pages. However, processors that can address more than 4 Gigabytes of memory have been developed, and for these processors, providing more than 4 Gigabytes of memory with 4-kilobyte pages requires table entries of more than 4 bytes. Table entries of more than 4 bytes are used for memories larger than 4 Gigabytes because the formats used for 4 Gigabyte and smaller memories do not have enough bits available to support the larger addresses of memories larger than 4 Gigabytes in size.

Because many operating systems have been designed based on 4-kilobyte pages and 4-byte table entries, these existing operating systems cannot take advantage of memory beyond 4 Gigabytes. Therefore, what is needed is a memory paging system having 4-byte table entries and 4-kilobyte pages that can access more than 4 Gigabytes of physical memory. The present invention provides a memory paging system that accesses more than 4 Gigabytes of memory while maintaining 4-kilobyte pages. Thus, modifications to existing operating systems to access memory beyond 4 Gigabytes are greatly reduced compared to a memory paging systems having table entries larger than 4 bytes.

SUMMARY OF THE INVENTION

A method and apparatus for accessing paged memory having two page sizes with a processor is described. A processor and memory are coupled to a bus. The processor accesses memory via a paging system having two page sizes. In one embodiment, pages in memory up to 64 Gigabytes in size are accessed via 4-byte table entries. In another embodiment, pages of one of the two page sizes are accessed by a page directory entry and a page table entry where the page table inherits permissions from the page directory entry.

DESCRIPTION OF THE FIGURES

The present invention is illustrated by way of example, and not by way of limitation, in the figures of the accompanying drawings in which like reference numerals refer to similar elements and in which:

FIG. 4a is one embodiment of a page directory entry for accessing 4-kilobyte pages in physical memory up to 4 Gigabytes in size.

FIG. 4b is one embodiment of a page table entry for accessing 4-kilobyte pages in physical memory up to 4 Gigabytes in size.

FIG. 4c is one embodiment of a page directory entry for accessing 4-Megabyte pages in physical memory up to 4 Gigabytes in size.

FIG. 7a is one embodiment of a page directory pointer table entry for accessing 4-kilobyte and 2-Megabyte pages in physical memory up to 64 Gigabytes in size.

FIG. 7b is one embodiment of a page directory entry for accessing 4-kilobyte pages in physical memory up to 64 Gigabytes in size.

FIG. 7c is one embodiment of a page table entry for accessing 4-kilobyte pages in physical memory up to 64 Gigabytes in size.

FIG. 7d is one embodiment of a page directory entry for accessing 2-Megabyte pages in physical memory up to 64 Gigabytes in size.

FIG. 10a is one embodiment of a page directory entry for accessing 4-kilobyte and 4-Megabyte pages in physical memory up to 64 Gigabytes in size.

FIG. 10b is one embodiment of a page table entry for accessing 4-kilobyte pages in physical memory up to 64 Gigabytes in size by inheriting permissions.

DETAILED DESCRIPTION

A method and apparatus for accessing pages in physical memory, where the pages in the physical memory have multiple sizes is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

The present invention provides a paged memory system having multiple page sizes. Pages of a first size are accessed via a page directory entry and a corresponding page table entry. The page directory entry stores a base physical address for a corresponding page table and control bits indicating permissions. The page table entry stores a base physical address of the page in memory. In one embodiment, the page table entry inherits permissions from the page directory entry. Pages of a second size are accessed via a page directory entry that stores a base physical address of the page and control bits indicating permissions associated with the page.

In order to access more than 4 Gigabytes of physical memory with 4-byte entries and 4-kilobyte pages, physical memory is divided into two sections. The first section of physical memory includes the addresses below 4 Gigabytes. In one embodiment, this section of memory is divided into 4-kilobyte or 4-Megabyte pages. In an alternative embodiment, where page tables inherit permissions from a page directory entry, 4-kilobyte pages include physical addresses below 4 Gigabytes.

The second section of memory includes those memory locations having a physical address of 4 Gigabytes or greater. In one embodiment, these memory locations are divided into 4-Megabyte pages. Because the 4-Megabyte pages are aligned on 4-Megabyte address boundaries, 4-byte entries provide sufficient address information to access memory locations above 4 Gigabytes while providing standard 4-kilobyte pages or 4-Megabyte pages for memory locations below 4 Gigabytes. Thus, 4-Megabyte pages may exist throughout memory up to 64 Gigabytes in size, while 4-Kilobyte pages are maintained only in the lower 4 Gigabytes of memory. In an alternative embodiment, where permissions are inherited, 4-kilobyte pages may exist thoughout memory up to 64 Gigabytes in size and 4-Megabyte pages may include addresses at or above 4 Gigabytes up to 64 Gigabytes.

Figure 1:
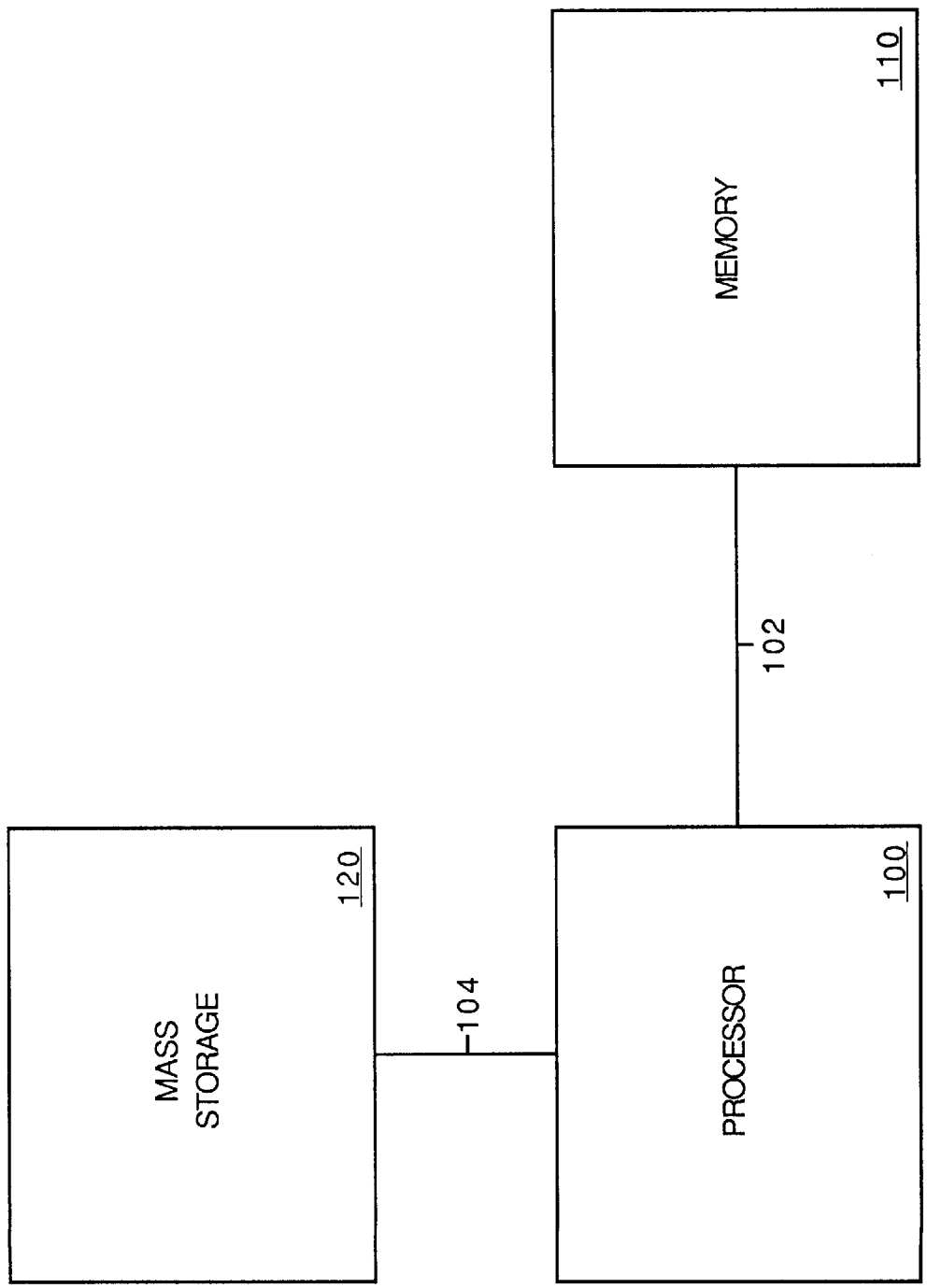
FIG. 1 is one embodiment of a block diagram of a computer system upon which the memory management system of the present invention may be implemented.

FIG. 1 is a computer system on which the present invention may be implemented. Processor 100 is coupled to mass storage device 120 via bus 104. Mass storage device may be a hard disk, an optical disc, a floppy disk, or other storage device. Processor 100 is also coupled to memory 110 via bus 102. Alternatively, memory 110 and mass storage device 120 may be coupled to a common bus. Additional processors (not shown in FIG. 1) may also be coupled to bus 102 to provide a multiprocessor system. Other devices that are not shown in FIG. 1 may also be coupled to processor 100. Input devices such as a keyboard, a mouse or other input device as well as output devices such as a monitor, a printer or other output device may be coupled to processor 100. In addition, a cache or other additional memory may be coupled to processor 100 via a shared or dedicated bus. Processor 100 retrieves and executes sequences of instructions stored in memory 110.

Memory 110 is divided into a plurality of pages, wherein each page includes a predetermined number of memory locations. These memory locations have physical addresses that correspond to a linear (or virtual) address generated by processor 100. In order to access the correct physical address, the linear address is translated to a corresponding physical address.

The present invention provides for translating linear addresses to corresponding physical addresses. In one embodiment, pages in memory are of two sizes and memory is divided into two portions. Pages of a first predetermined size include physical addresses below a particular memory location (i.e., the first portion of memory). Pages of a second predetermined size may include any memory location (i.e., the first or the second portion of memory). For example, pages below 4 Gigabytes may be 4 kilobytes or 4 Megabytes in size while pages at 4 Gigabytes and greater may be 4 Megabytes in size. Of course, page sizes other than 4 kilobytes and 4 Gigabytes may be chosen. Also, more than two page sizes may be implemented. Alternatively, pages below 4 Gigabytes may be 4 kilobytes in size, while pages at or above 4 Gigabytes may be 4 kilobytes or 4 Megabytes in size.

Figure 2:
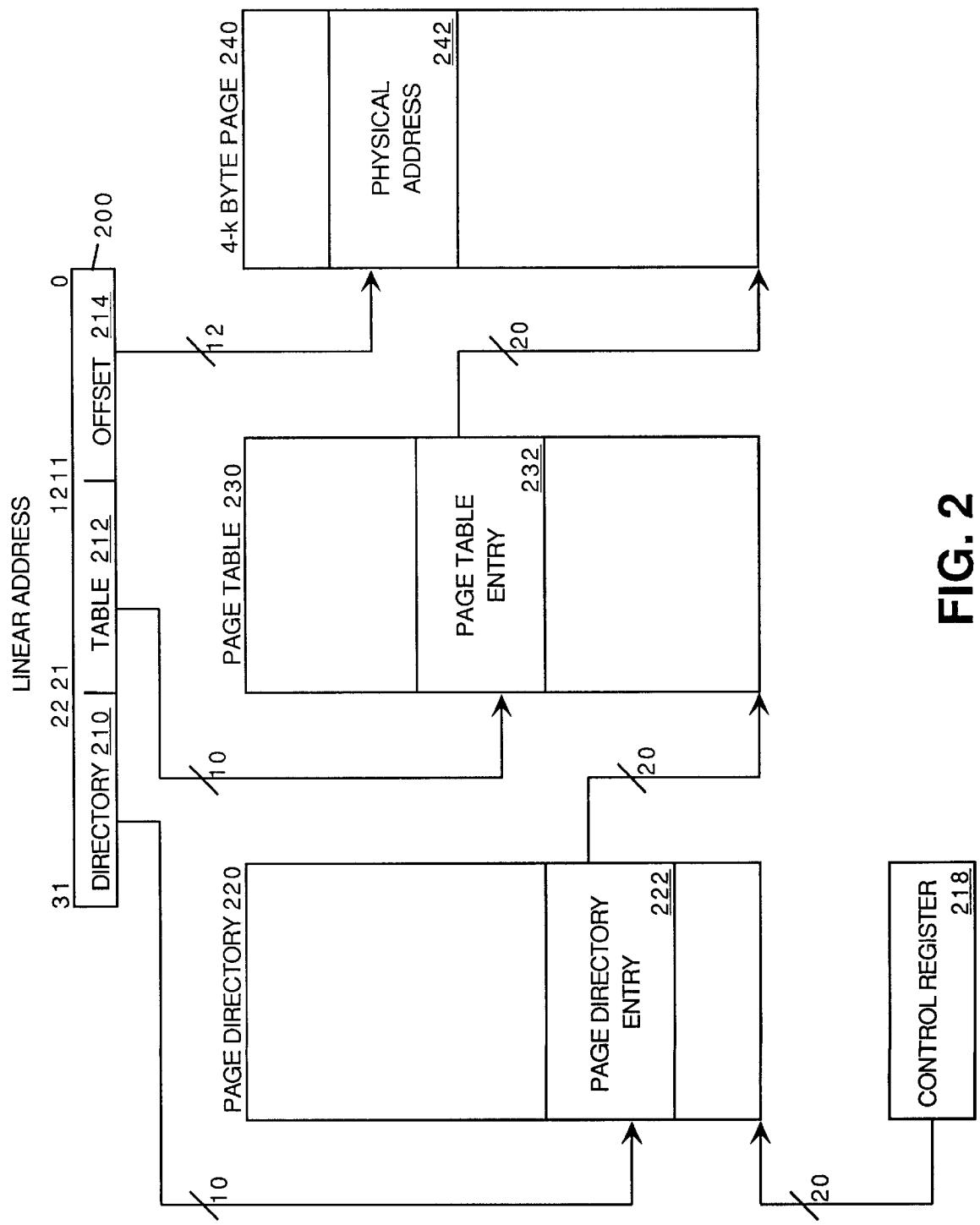
FIG. 2 is one embodiment of a 32-bit linear address scheme for accessing 4-kilobyte pages in physical memory up to 4 Gigabytes in size.

Overview of an Addressing Scheme to Access up to 4 Gigabytes of Memory with 4-kilobyte and 4-Megabyte Pages FIG. 2 is one embodiment of a 32-bit linear address scheme for accessing 4-kilobyte pages in physical memory up to 4 Gigabytes in size. This approach assumes that memory 110 is divided into 4-kilobyte pages. However, other pages sizes may be used.

In one embodiment, linear address 200 comprises three sets of bits: directory bits 210, table bits 212 and offset bits 214. Each of these sets of bits provides an offset used in translating linear address 200 to a corresponding physical address.

Control register 218 stores a base address of page directory 220. Directory bits (bits 22–31 of linear address 200) are used as an offset from the base address of page directory 220 to access page directory entry 222 that corresponds to linear address 200. In one embodiment, page directory 220 comprises 1024 page directory entries of 32-bit data. Each 32-bit page directory entry stores a 20-bit address, aligned on a 4-kilobyte boundary, corresponding to the base physical address of a page table such as page table 230 in addition to control bits. Other page directory entry sizes may be used.

In one embodiment, page table 230 indicated by page directory entry 222 is one of 1024 page tables maintained in memory, each of which may correspond to an entry in page directory 220. Table bits 212 (bits 12–21 of linear address 200) are used as an offset from the base address of page table 230 to access page table entry 232. Page table 230 comprises 1024 page table entries. Page table entry 232 comprises a 32-bit entry having a 20-bit address aligned on a 4-kilobyte boundary as well as control bits. The 20-bit address in page table entry 232 corresponds to the base address of 4-kilobyte page 240.

Page 240 is one of 1024 pages, each of which may have a corresponding entry in page table 230. Because page table 230 is one of 1024 page table, the addressing scheme of FIG. 2 can access $2^{20}$ pages. Offset bits 214 (bits 0–11 of linear address 200) are used as an offset from the base physical address of page 240 to access physical address 242. Because offset bits 214 comprise 12 bits to index a 4-kilobyte page, each byte within page 240 may be individually addressed. Thus, linear address 200 is translated to corresponding physical address 242, which is part of 4-kilobyte page 240.

Figure 3:
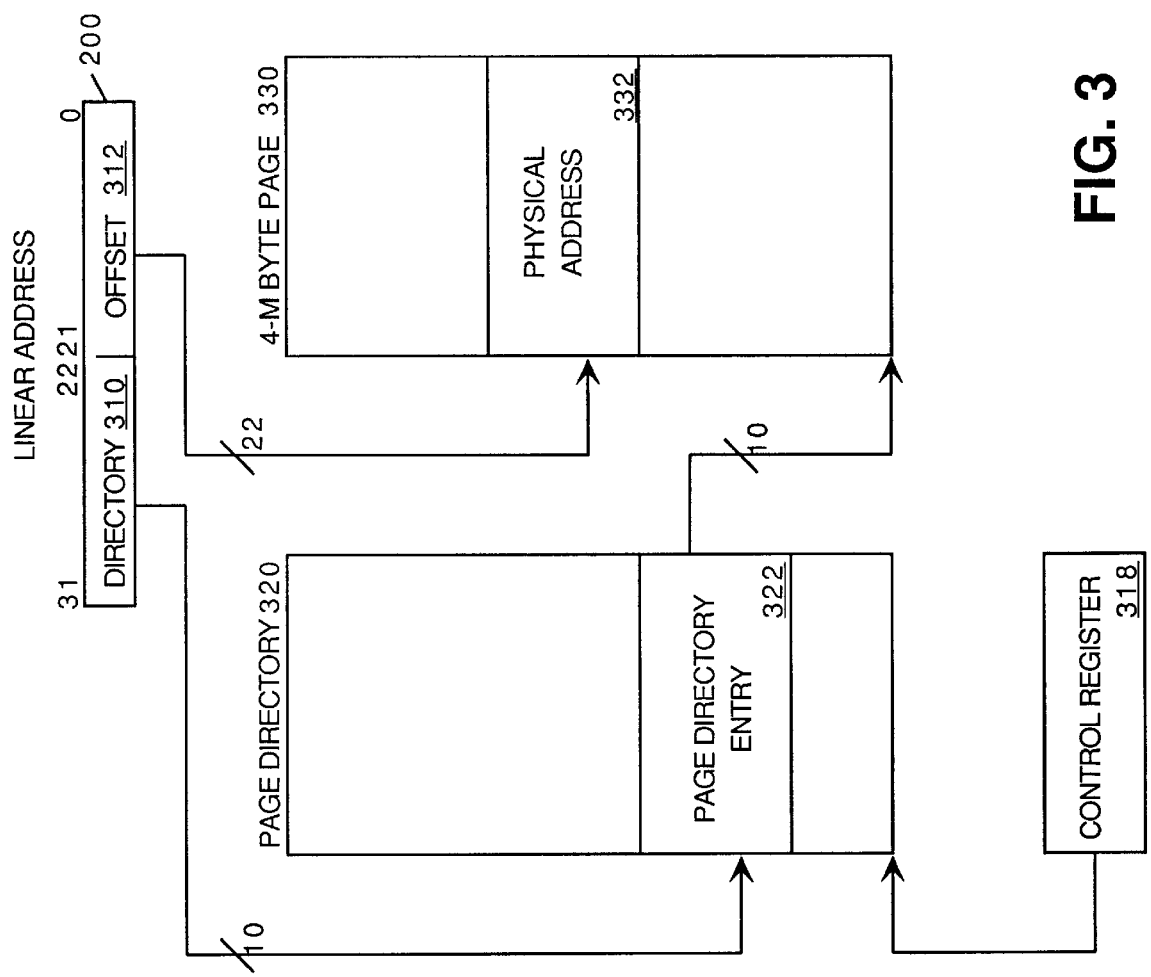
FIG. 3 is one embodiment of a 32-bit linear address scheme of accessing 4-Megabyte pages in physical memory up to 4 Gigabytes in size.

FIG. 3 is one embodiment of a 32-bit linear address scheme for accessing 4-Megabyte pages in physical memory up to 4 Gigabytes in size. This approach assumes that memory 110 is divided into 4-Megabyte pages; however, other page sizes may be used.

In one embodiment, linear address 300 comprises two sets of bits: directory bits 310 and offset bits 312. Control register 318 stores the base physical address of page directory 320. Page directory 320 is accessed in the same manner as page directory 220 in FIG. 2.

Directory bits 310 provide an offset from the base physical address provided by control register 318. By using directory bits 310 bits (22–31 of linear address 300) as an offset, page directory entry 322 is accessed. In one embodiment, page directory entry 322 is one of 1024 entries in page directory 320. Page directory entry 322 comprises control bits as well as a 10-bit base address corresponding to a base address of 4-Megabyte page 330.

Page 330 is one of up to 1024 4-Megabyte pages in physical memory. Offset bits 312 (bits 0–21 in linear address 300) are used to offset from the base address of page 330 to access physical address 332. Thus, linear address 300 is translated to physical address 332, which is part of 4-Megabyte page 330.

FIG. 4a is one embodiment of a page directory entry for accessing 4-kilobyte pages in physical memory up to 4 Gigabytes in size. Some of these bits may not be required for some systems. Bit 0 (P) is the present flag. In one embodiment, this bit indicates whether the page table indicated by the page directory entry is currently loaded in memory 110 or if it is in mass storage device 120. In one embodiment, P is set if the page table is in memory 110 and clear if the page table is in mass storage device 120.

Bit 1 (R/W) specifies the read/write privileges of the entry. In one embodiment, when the bit is clear only read privileges are allowed and when the bit is set both read and write privileges are allowed. Bit 2 (U/S) specifies whether user or supervisor privileges are granted. In one embodiment, when the bit is set user privileges are granted and when the bit is clear supervisor privileges are granted.

Bit 3 (PWT) indicates whether the caching policy is write-through or write-back. In one embodiment, when the bit is set the caching policy is write-through, and when the bit is clear the caching policy is write-back. Bit 4 (PCD) controls caching of the page or table indicated by the entry. In one embodiment, when the bit is set caching is allowed; when the bit is clear caching is prevented.

Bit 5 (A) indicates whether the table or page indicated by the entry has been accessed. In one embodiment, when the bit is clear, the page or table has not been accessed since being loaded into memory 110. In one embodiment, if the bit is set the page or table has been accessed since it was loaded into memory 110. In one embodiment, bit 6 is reserved and set to 0.

Bit 7 (P/S) determines page size. In one embodiment, when this bit is clear the page size is 4-kilobytes and when the bit is set the page size is 4-Megabytes. Bit 8 (G) indicates a global page when set. In one embodiment, bits 9–11 are reserved for use by software. In one embodiment, bits 12–31 indicate the base physical address of a page table.

FIG. 4b is one embodiment of a page table entry for accessing 4-kilobyte pages in physical memory up to 4 Gigabytes in size. The bits of the page directory entry are the same as the bits discussed above with respect to the page directory entry of FIG. 4a except as described below.

Bit 0 (P) indicates whether the page indicated by the page directory entry is located in memory 110 or mass storage device 120. Bit 6 (D) indicates whether the corresponding page has been written. In one embodiment, if the bit is set, the page has been written and if the bit is clear the page has not been written. Bit 7 is set to 0 because page tables are only used with 4-kilobyte pages, as discussed above with respect to FIGS. 2 and 3. Bits 12–31 indicate the base physical address of a 4-kilobyte page in memory 110.

FIG. 4c is one embodiment of a page directory entry for accessing 4-Megabyte pages in physical memory up to 4 Gigabytes in size. The bits of the page directory entry for accessing 4-Megabyte pages are the same as the bits discussed above with respect to the page directory entry for accessing 4-kilobyte pages of FIG. 4a except as described below.

Bit 6 (D) indicates whether the corresponding page has been written. In one embodiment, if the bit is set, the page has been written and if the bit is clear the page has not been written. Bits 12–21 are reserved. Bits 22–31 indicate a base physical address of a 4-Megabyte page in memory 110.

Figure 5:
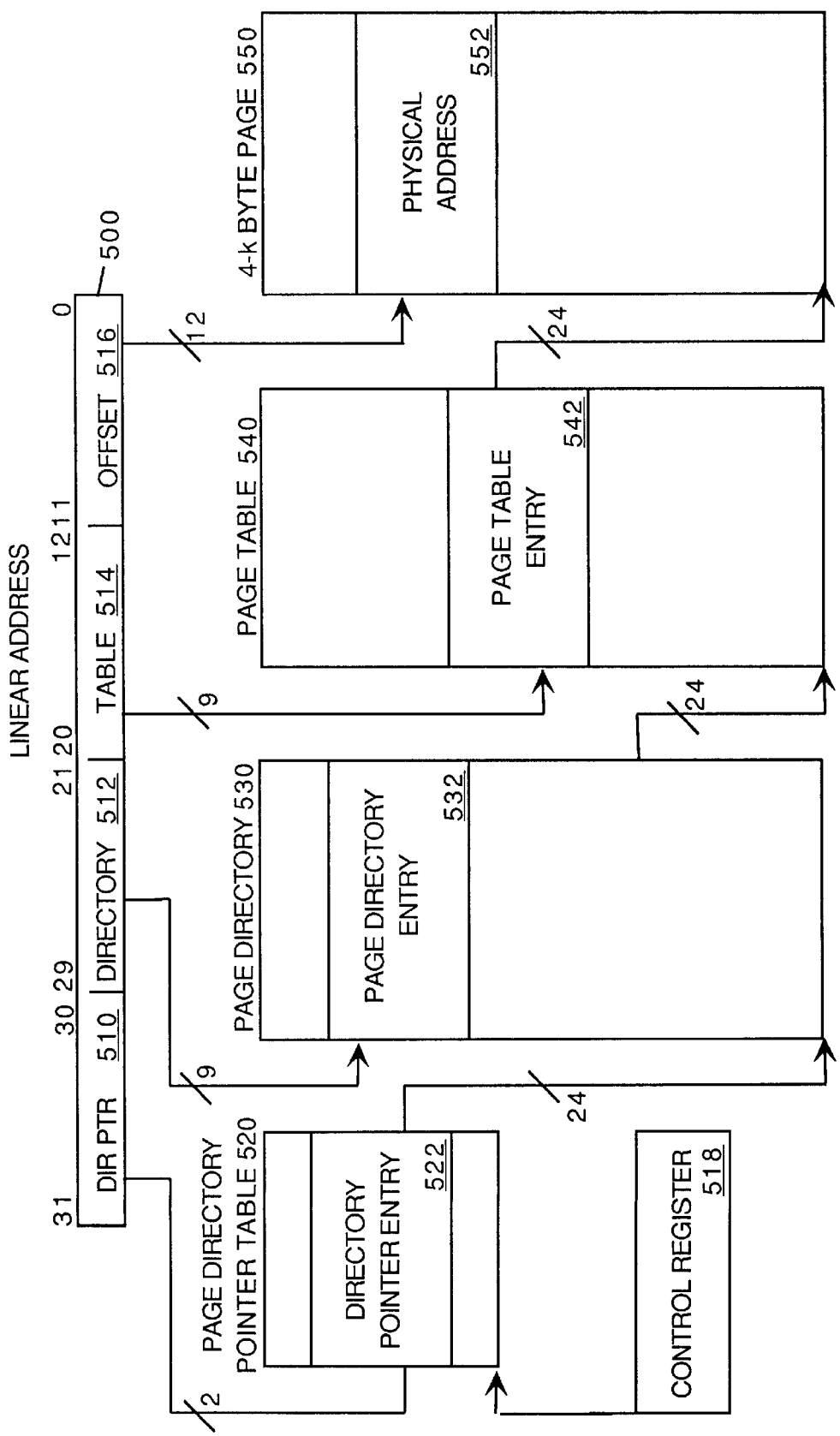
FIG. 5 is one embodiment of a 32-bit linear address scheme for accessing 4-kilobyte pages in physical memory up to 64 Gigabytes in size.

Overview of an Addressing Scheme to Access up to 64 Gigabytes of Memory with 4-kilobyte and 2-Megabyte Pages FIG. 5 is a 32-bit linear address scheme for accessing 4-kilobyte pages in physical memory up to 64 Gigabytes in size. This scheme can be used to linearly address up to $2^{20}$ 4-kilobyte pages that span a physical address space of 64 Gigabytes.

In one embodiment, Linear address 500 comprises four sets of bits: directory pointer (dir. ptr.) bits 510, directory bits 512, table bits 514, and offset bits 516. Of course, the sizes of these four sets of bits may be altered.

The base physical address of page directory pointer table 520 is provided by control register 518. Directory pointer bits 510 (bits 30 and 31 in linear address 500) provide an offset to one of four entries in page directory pointer table 520. In one embodiment, the selected page directory pointer entry 522 provides the 36-bit base physical address of page directory 530. Page directory 530 is one of four page directories maintained in memory.

Directory bits 512 (bits 21–29 in linear address 500) provide an offset to page directory entry 532 in page directory 530. In one embodiment, page directory entry 532 is one of 512 entries in page directory 530 each having a base physical address of a corresponding page directory. Page directory entry 532 provides the 36-bit base physical address of page table 540. Page table 540 is one of 512 page tables maintained in memory.

Table bits 514 (bits 12–20 in linear address 500) provide an offset to page table entry 542 in page table 540. In one embodiment, each of the 512 page table entries stores a base physical address of a corresponding page in memory 110. Page table entry 542 is one of 512 entries in page table 540. Page table entry 542 provides the 36-bit base physical address of page 550, which is one of $2^{24}$ 4-kilobyte pages maintained in memory.

Offset bits 516 (bits 0–11 in linear address 500) provide an offset to physical address 552 in page 550. Physical address 552 is one of 4096 physical addresses in page 550. Thus, linear address 500 is translated to physical address 552.

Figure 6:
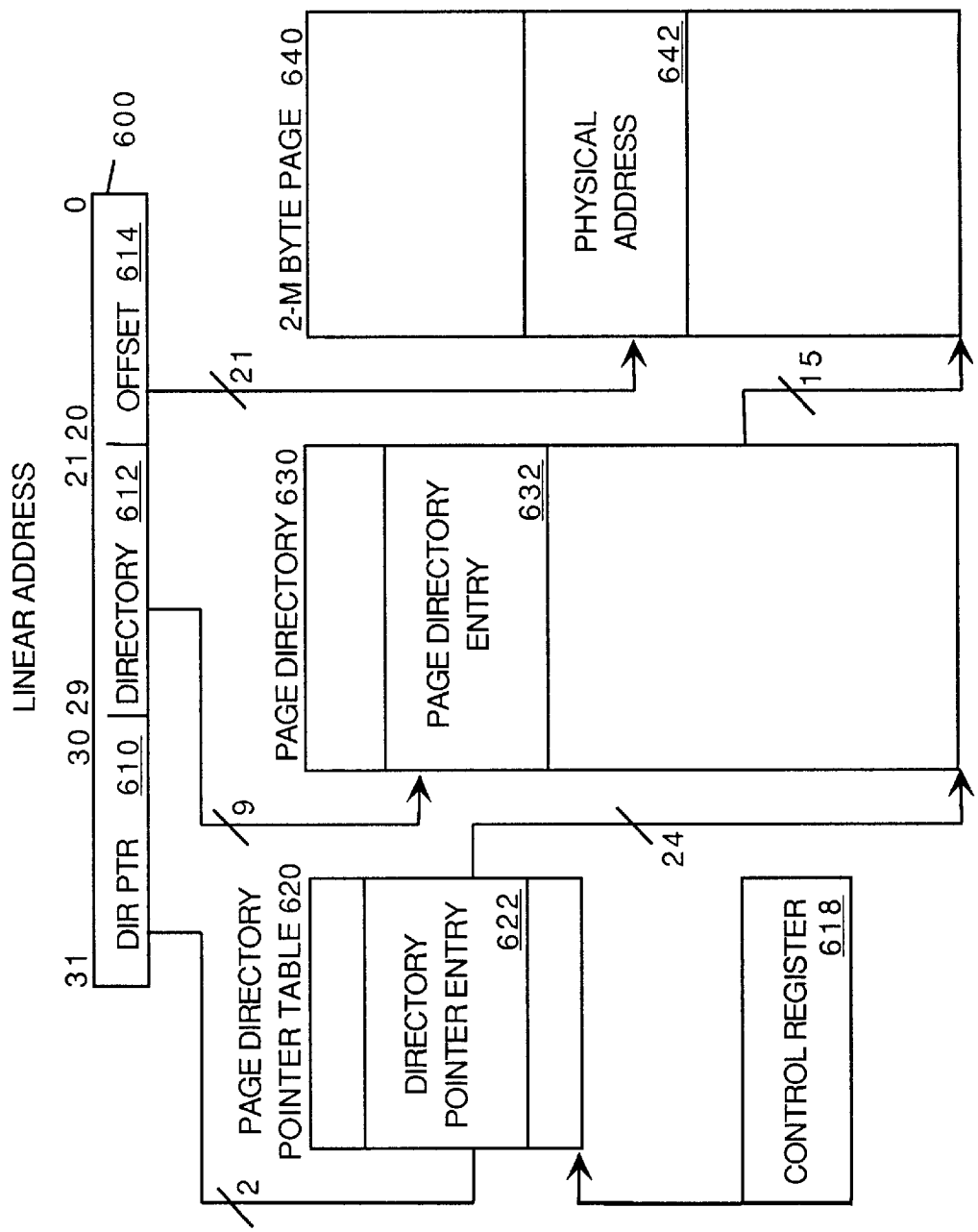
FIG. 6 is one embodiment of a 32-bit linear address scheme for accessing 2-Megabyte pages in physical memory up to 64 Gigabytes in size.

FIG. 6 is a 32-bit linear address scheme for accessing 2-Megabyte pages in physical memory up to 64 Gigabytes in size. In one embodiment, Linear address 600 comprises three sets of bits: directory pointer (dir. ptr.) bits 610, directory bits 612, and offset bits 614. Of course, the sizes of these three sets of bits may be altered.

The base physical address of page directory pointer table 620 is provided by control register 618. Directory pointer bits 610 (bits 30 and 31 in linear address 600) provide an offset to one of four entries in page directory pointer table 620. In one embodiment, the selected directory pointer entry 622 provides the 36-bit base physical address of page directory 630. Page directory 630 is one of four page directories maintained in memory.

Directory bits 612 (bit 21–29 in linear address 600) provide an offset to page directory entry 632 in page directory 630, which provides the base physical address for 2-Megabyte page 640 in memory. Offset bits 614 (bits 0–20 in linear address 600) provide an offset to physical address 642 in 2-Megabyte page 640. Thus, linear address 600 is translated to physical address 642.

FIG. 7a is a page directory pointer table entry, such as page directory pointer entry 522. In one embodiment, page directory pointer entry 522 is a 64-bit or 8-byte entry. Bits 0–2, 5–8, 9–11 and 36–63 are reserved. Bits 32–35 comprise the four high-order, or upper, bits of the page directory base address. Bits 12–31 comprise the low-order, or lower, bits of the page directory base address. Bits 3 and 4 are PWT and PCD bits as described above.

FIG. 7b is a page directory entry for 4-kilobyte pages, such as page directory entry 532. In one embodiment, page directory entry 532 is 64 bits. Bits 9–11 and 36–63 are reserved. Bits 0–5 are control bits as described above. Bits 6–8 are set to 0. Bits 32–35 comprise the four high-order, or upper, bits of the page table base address. Bits 12–31 comprise the low-order, or lower, bits of the page table base address.

Figures 7C, 7D:
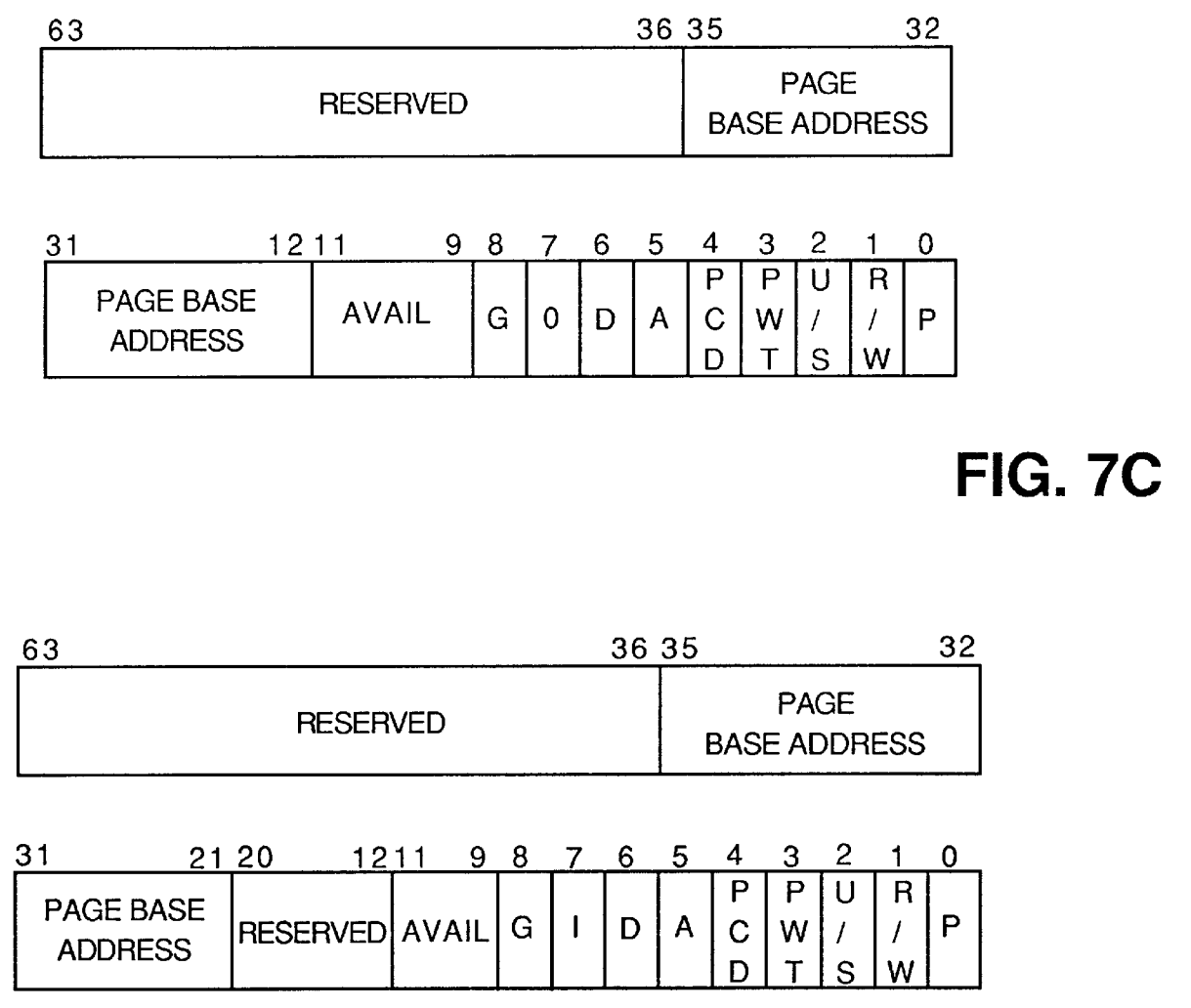

FIG. 7c is a page table entry for 4-kilobyte pages, such as page table entry 542. In one embodiment, page table entry 542 is a 64-bit entry. Bits 9–11 and 36–63 are reserved. Bits 0–8 are control bits as described above. Bits 32–35 comprise the four high-order, or upper, bits of the page base address. Bits 12–31 comprise the low-order, or lower, bits of the page base address.

FIG. 7d is a page directory entry for 2-Megabyte pages, such as page directory entry 632. According to one embodiment, page directory entry 632 comprises 64 bits. Bits 9–11, 12–20 and 36–63 are reserved bits. Bits 0–8 are control bits as discussed above. Bits 32–35 comprise the four high-order, or upper, bits of the page base address. Bits 12–31 comprise the low-order, or lower, bits of the page base address.

This, paged memory that is greater than 4 Gigabytes in size can be accessed via use of two page sizes (4-kilobytes and 2-Megabytes) and 8-byte table entries. Because most of the high order 4 bytes of these entries are unused, such a paging scheme is not efficient. In addition, operating systems designed for use with 4-kilobyte and 4-Megabyte pages and 4-byte table entries cannot be used. Given that operating systems are complex programs that are not easily rewritten, full implementation of the addressing scheme described with respect to FIGS. 5–7 would be very expensive.

Figure 8:
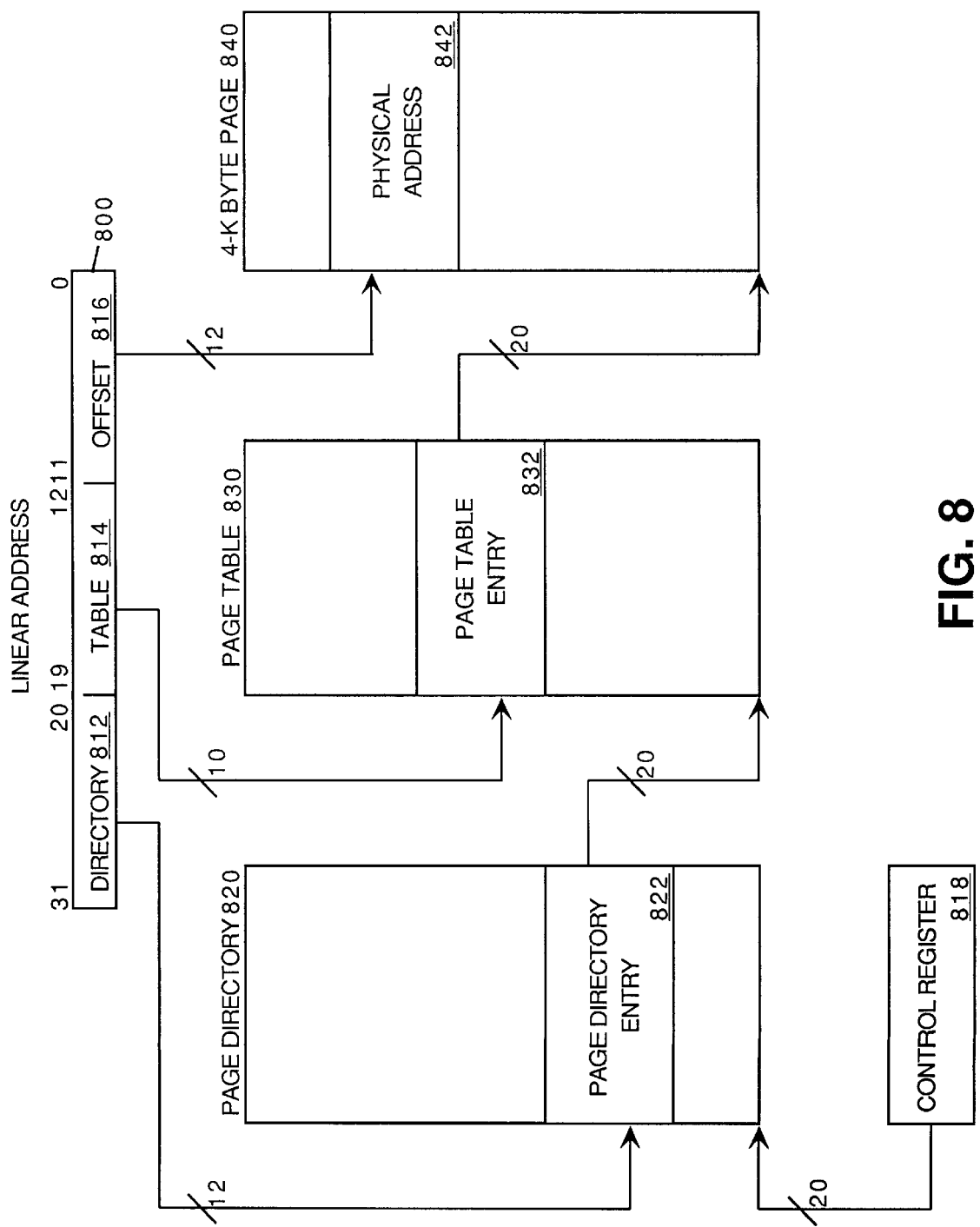
FIG. 8 is one embodiment of a 32-bit linear address scheme for accessing 4-kilobyte pages in physical memory up to 64 Gigabytes in size.

Overview of an Address Scheme to Access up to 64 Gigabytes of Memory with 4-kilobyte and 4-Megabyte Pages FIG. 8 is a 32-bit linear address scheme for accessing 4-kilobyte pages in physical memory up to 64 Gigabytes in size. In one embodiment, this scheme can be used to linearly address up to $2^{20}$ 4-kilobyte pages that span the lower 4 Gigabytes of a 64-Gigabyte physical address space. In an alternative embodiment where permissions are inherited, this scheme may be used to linearly address 4-kilobyte pages in any 4-kilobyte aligned location of a physical address space up to 64 Gigabytes in size. In one embodiment, linear address 800 comprises three sets of bits: directory bits 812, table bits 814 and offset bits 816. While described in terms of physical memory up to 64 Gigabytes in size, the address scheme of FIG. 8 may be used to address 4-kilobyte pages in the lower 4 Gigabytes of a memory of any size.

In one embodiment, the base physical address of page directory table 820 is provided by control register 818. Directory bits 812 (bits 22–31 of linear address 800) provide an offset to an entry in page directory 820. The selected page directory entry 822 provides a base physical address of page table 830 and control bits in directory entry 822 indicate permissions for page table 830. Page directory entry 822 is one of 4096 entries in page directory 820.

Table bits 814 (bits 12–21 in linear address 800) provide an offset to page table entry 832 in page table 830. In one embodiment, Each of the 1024 page table entries stores a base physical address of a corresponding 4-kilobyte page in memory 110. Page table entry 832 provides the base physical address of 4-kilobyte page 840. In one embodiment, four control bits (e.g. U/S, R/W, PWT and PCD) indicating permissions for page 830 are not stored in page table entry 832. The control bits not included in page table entry 832 are inherited from page directory entry 822. In other words, the permissions indicated by page directory entry 822 for page table 830 are used by the entries in page table 830 to indicate permissions for pages, such as page 840, for which a base physical address is stored.

Offset bits 816 (bits 0–11 in linear address 800) provide an offset to physical address 842 in page 840. Physical address 842 is one of 4096 physical addresses in page 840. Thus, linear address 800 is translated to physical address 842.

In one embodiment, processor 100 accesses 4-byte entries in page directory 820 and page table 830 to access 4-kilobyte pages having memory locations below 4 Gigabytes. Alternatively, in order to access pages of a first predetermined size, processor 100 accesses a page directory table in memory 110. The page directory table stores multiple entries each storing a base physical address for a page table and control bits indicating permissions for associated the page table. The page table in memory 110 corresponding to a selected page directory entry is accessed by processor 100.

The page table stores multiple entries each having a base physical address for a page in memory 110 and control bits indicating permissions for the corresponding page in memory 100. In one embodiment, the control bits stored in page table entries indicate permissions that are a subset of the permissions stored in the corresponding page directory entry. Permissions not indicated by control bits in the page table entry are indicated by the page directory entry storing the base physical address of the page table in which the page table entry is stored. Thus, the page table entry may inherit permissions from the page directory entry. Processor 100 then determines an offset from the base physical address of the page in memory 110 to access the desired memory location based on the offset bits of the linear address. In an inheritance embodiment, the permissions indicated by the page directory entry and the page table entry are applied to the page accessed.

Figure 9:
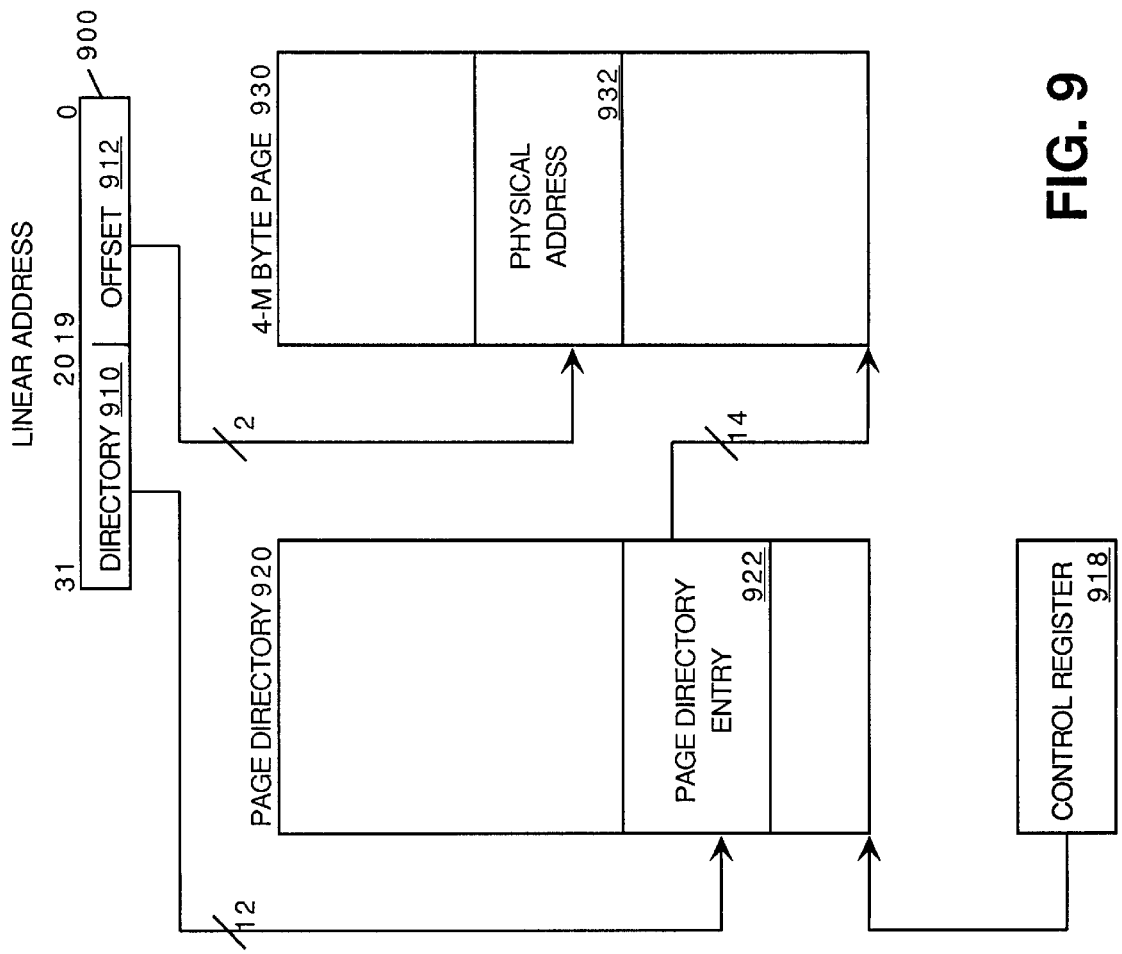
FIG. 9 is one embodiment of a 32-bit linear address scheme for accessing 4-Megabyte pages in physical memory up to 64 Gigabytes in size.

FIG. 9 is a 32-bit linear address scheme for accessing 4-Megabyte pages in physical memory up to 64 Gigabytes in size. In one embodiment, this scheme can be used to address up to $2^{10}$ 4-Megabyte pages that are aligned with any 4-Megabyte boundary in memory up to 64 Gigabytes in size. In an inheritance embodiment, 4-Megabyte pages are aligned with 4-Megabyte boundaries above 4 Gigabytes in memory up to 64 Gigabytes in size.

In one embodiment, Linear address 900 comprises three sets of bits: directory bits 910, and offset bits 912. Of course, the sizes of these three sets of bits may be altered.

Directory bits 910 (bit 20–31 in linear address 900) provide an offset to page directory entry 922 in page directory 920, which provides the base physical address for 4-Megabyte page 930 in memory. Offset bits 912 (bits 0–19 in linear address 900) provide an offset to physical address 932 in 4-Megabyte page 930.

Thus, to access a 4-Megabyte page in memory according to one embodiment of the present invention, processor 100 accesses a page directory in memory 110. The page directory stores multiple entries that each store a base physical address of a 4-Megabyte page in memory 110 and control bits indicating permissions for the page. Processor 100 determines a physical address in memory 110 by applying an offset to the base physical address in the page directory entry. The permissions indicated by the page directory entry are applied to the page.

In an alternative embodiment, 4-Megabyte pages in memory above 4 Gigabytes may be addressed in a similar manner in a physical memory up to 1.1 Terabytes in size. In such an embodiment, unused bits in the page directory entries discussed above (e.g., bits 9–11) are used to provide sufficient address bits to address 4-Megabyte pages in memory above 4 Gigabytes.

FIG. 10a is one embodiment of a page directory entry for accessing 4-kilobyte and 4-Megabyte pages in physical memory up to 64 Gigabytes in size. Bits 22–31 are the lower 10 bits of a page table base address if a 4-kilobyte page is being addressed. Similarly, bits 22–31 are the lower 10 bits of a page base physical address if a 4-Megabyte page is being addressed. The upper four address bits are bits 13–16 for both 4-kilobyte and 4-Megabyte paging schemes. Bits 17–21 are reserved and bits 0–12 are used as discussed above with respect to FIGS. 4a–4c and 7a–7d.

In one embodiment, a bit in a control register is used to indicate whether a 4-kilobyte or a 4-Megabyte page is being addressed. Alternatively, a bit in the page directory entry, such as bit 17, could be used to indicate whether a 4-kilobyte page or a 4-Megabyte page is being addressed. If a 4-Megabyte page is being addressed, the upper and lower base address bits provide a base physical address for the page addressed. Offset bits from the linear address are then used to access the proper memory location within the page.

If a 4-kilobyte page is being addressed the upper and lower base address bits of the page directory entry provide a base physical address of a page table. Page table base addresses are aligned on a 4-Megabyte boundary in memory. Alternatively, by providing more address bits, such as one or more of reserved bits 17–21, the page table base address may be on a different boundary. For each additional bit provided as a base address for the page table, the alignment requirement is decreased by a power of two (i.e., 2 Megabyte, 1 Megabyte, 512 kilobyte).

Page table entries with a similar format are accessed by determining an offset from the page table base address as discussed above with respect to FIG. 8. The selected page table entry provides a base physical address of a page 4-kilobyte in memory. Offset bits are used to access a memory location within the page.

FIG. 10b is one embodiment of a page table entry for accessing 4-kilobyte pages in physical memory up to 64 Gigabytes in size in an inheritance paging scheme. Bits 12–31 provide the lower base address bits for the base physical address of a 4-kilobyte page in memory. Bits 1–4 provide the upper 4 bits of the physical address. Bits 5–11 are as described above; however, the permissions that are provided by bits 1–4 in the page directory entry of FIG. 4a (e.g. U/S, R/W, PWT, and PCD) are used for permissions to the page indicated by the page table entry of FIG. 10b rather than having those permission bits as part of the page table entry. Thus, page table entries inherit permissions from the page directory entries providing the base address for the page table in which the page table entry is found. Offset bits in the linear address are used to access the memory location corresponding to the linear address translated.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system comprising:
   a bus;
   a memory coupled to the bus, wherein the memory is addressed as paged memory having a first page size and a second page size, and further wherein the memory is greater than 4 Megabytes in size;
   a plurality of page directory tables stored in the memory, each page directory table having a plurality of 4-byte entries storing a base address and control bits indicating permissions;
   a plurality of page tables stored in the memory, each page table having a plurality of 4-byte entries and corresponding to one of the plurality of base addresses, wherein each page table entry stores a base address of a page stored in memory; and
   a processor coupled to the bus, wherein the processor accesses pages in the memory of the first page size, the processor accesses one of the plurality of page directory entries and one of the plurality of page table entries to access a base address for the page of the first page size, wherein the page table entry inherits permissions from the page directory entry, and wherein the processor accesses pages in memory of the second page size, the processor accesses one of the plurality of page directory entries to retrieve a base address for the page of the second page size.

2. The system of claim 1, wherein the memory pages of the first size are 4 kilobytes in size.

3. The system of claim 1, wherein the memory pages of the second size are 4 Megabytes.

4. The system of claim 3, wherein the memory pages of the second size have addresses less than 4 Gigabytes.

5. A method for accessing paged memory comprising:
   decoding a linear address;
   accessing a page directory table entry that provides a base address in response to decoding the linear address;
   if the page directory table entry corresponds to a first page of a first predetermined size, then
      accessing a page table having a page table base address corresponding to the base address, wherein the page table has an entry that inherits permissions from the page directory table entry and provides a first page base address of the first page, and
      accessing a physical address in the first page corresponding to the linear address;
   if the page directory table entry corresponds to a second page of a second predetermined size, then
      accessing a second physical address in the second page, wherein the second page has a second page base address corresponding to the base address in the page directory entry, and further wherein the second physical address corresponds to the linear address.

6. The method of claim 5, wherein the first predetermined size is 4 kilobytes.

7. The method of claim 5, wherein the second predetermined size is 4 Megabytes.

8. The method of claim 5, wherein the pages of the first predetermined size have base page addresses less than 4 Gigabytes.

9. The method of claim 5, wherein the memory is greater than 4 Gigabytes in size.

10. The method of claim 5, wherein the page directory table entry and the page table entry are 4-byte entries.

11. The method of claim 5, wherein accessing a page directory entry further comprises:
    determining a base address of a page directory;
    determining an offset from the base address of the page directory based on directory bits of the linear address; and
    accessing the page directory entry having a base address of a corresponding page table based on an offset from the base address of the page directory table.

12. The method of claim 5, wherein accessing a physical address in the first page further comprises:
   determining a base address of a page table based on the page directory entry;
   determining an offset from the base address of the page table based on table bits of the linear address; and
   accessing a page table entry having a base address of the first page.

13. The method of claim 5, wherein accessing a physical address in the first page further comprises:
   determining a base address of the first page based on a page table entry;
   determining an offset from the base address of the first page based on offset bits of the linear address; and
   accessing the physical address corresponding to the linear address.

14. A system comprising:
   a bus;
   a memory coupled to the bus; and
   a processor coupled to the bus, wherein the processor accesses the memory via a paging system having two page sizes, further wherein pages of one of the two page sizes are accessed by a page directory entry and a page table entry where the page table entry inherits permissions from the page directory entry.

15. The system of claim 14, wherein the memory is greater than 4 Gigabytes in size.

16. The system of claim 14, wherein the page directory entry and the page table entry are 4-bytes in size.

17. The system of claim 14, wherein the memory comprises a first portion and a second portion, the first portion of memory comprises memory locations up to 4 Gigabytes.

18. The system of claim 14, wherein the memory comprises a first portion and a second portion, the second portion of memory comprises memory locations above 4 Gigabytes.

19. The system of claim 14, wherein the memory comprises a first portion and a second portion, the first portion of memory comprises a plurality of 4-kilobyte pages and a plurality of 4-Megabyte pages.

20. The system of claim 14, wherein the memory comprises a first portion and a second portion, the second portion of memory comprises a plurality of 4-Megabyte pages.

21. The system of claim 17, wherein pages in the first portion of memory are accessed by the processor accessing a first page directory entry having a base address of a corresponding page table, accessing a base address of a corresponding page in the first portion of memory from an entry in the page table, and accessing a physical address in the corresponding page in the first portion of memory corresponding to a linear address.

22. The system of claim 18, wherein pages in the second portion of memory are accessed by the processor accessing a page directory entry having a base address of a corresponding page in the second portion of memory, and accessing a physical address in the corresponding page in the second poriton of memory corresponding to a linear address.

* * * * *